(12) United States Patent
Ringen et al.

(10) Patent No.: US 9,106,732 B2
(45) Date of Patent: *Aug. 11, 2015

(54) SYSTEM AND METHOD FOR CONTROLLING THE USE OF A WIRELESS DEVICE

(71) Applicant: AT&T Intellectual Property I, L.P., Atlanta, GA (US)

(72) Inventors: Deron J. Ringen, Acworth, GA (US); Brenda S. Wilch, Topeka, KS (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,448

(22) Filed: Jun. 26, 2014

(65) Prior Publication Data

US 2014/0308948 A1 Oct. 16, 2014

Related U.S. Application Data

(63) Continuation of application No. 12/023,465, filed on Jan. 31, 2008, now Pat. No. 8,798,608, which is a continuation of application No. 11/611,006, filed on Dec. 14, 2006, now Pat. No. 7,336,945, which is a continuation of application No. 10/159,636, filed on May 30, 2002, now Pat. No. 7,177,632.

(51) Int. Cl.
*H04Q 7/10* (2006.01)
*H04M 3/22* (2006.01)
*H04M 1/2745* (2006.01)
(Continued)

(52) U.S. Cl.
CPC ...... *H04M 3/2272* (2013.01); *H04M 1/274516* (2013.01); *H04M 1/663* (2013.01); *H04M 1/67* (2013.01); *H04M 1/677* (2013.01);
(Continued)

(58) Field of Classification Search
USPC .............. 455/418, 419, 411, 414.1, 565, 416, 455/445, 456.1, 420; 379/200, 210.02, 379/211.02
See application file for complete search history.

(56) References Cited

U.S. PATENT DOCUMENTS

| | | |
|---|---|---|
| 5,485,505 A | 1/1996 | Norman et al. |
| 5,815,808 A | 9/1998 | Valentine |

(Continued)

FOREIGN PATENT DOCUMENTS

WO 9303585 2/1993

OTHER PUBLICATIONS

Non-Final Rejection mailed Feb. 22, 2005 for U.S. Appl. No. 10/159,636.

(Continued)

*Primary Examiner* — Ajit Patel
*Assistant Examiner* — Julio Perez
(74) *Attorney, Agent, or Firm* — Amin, Turocy & Watson, LLP

(57) ABSTRACT

Preferred embodiments of the present invention provide for enabling a user to select telephone numbers to which a wireless device may place calls and from which the wireless device may receive calls. One preferred embodiment of the present invention includes software for use on a general purpose computer allowing the user to input into the memory of a wireless device desired telephone numbers that may not be changed by the operator of the wireless device. The computer software also programs the wireless device to only place calls to, or receives calls from, the telephone numbers entered into the memory of the wireless device by the owner.

20 Claims, 4 Drawing Sheets

(51) Int. Cl.
*H04M 1/663* (2006.01)
*H04M 1/67* (2006.01)
*H04M 1/677* (2006.01)
*H04M 1/725* (2006.01)
*H04M 3/38* (2006.01)

(52) U.S. Cl.
CPC ....... *H04M1/72522* (2013.01); *H04M 1/72527* (2013.01); *H04M 1/72588* (2013.01); *H04M 3/38* (2013.01)

(56) References Cited

U.S. PATENT DOCUMENTS

| | | | |
|---|---|---|---|
| 5,864,757 | A | 1/1999 | Parker |
| 5,884,193 | A | 3/1999 | Kaplan |
| 5,926,756 | A | 7/1999 | Piosenka et al. |
| 5,930,703 | A | 7/1999 | Cairns |
| 5,970,405 | A | 10/1999 | Kaplan et al. |
| 6,125,273 | A | 9/2000 | Yamagishi |
| 6,151,493 | A | 11/2000 | Sasakura et al. |
| 6,208,872 | B1 | 3/2001 | Schmidt |
| 6,233,447 | B1 | 5/2001 | Tomoike |
| 6,259,908 | B1 | 7/2001 | Austin |
| 6,269,248 | B1 | 7/2001 | Jayawardene |
| 6,321,079 | B1 | 11/2001 | Cooper |
| 6,351,639 | B1 | 2/2002 | Motohashi |
| 6,529,725 | B1 | 3/2003 | Joao et al. |
| 6,751,485 | B2 | 6/2004 | Ranta |
| 6,757,534 | B2 | 6/2004 | Bach et al. |
| 6,788,673 | B1 | 9/2004 | Koskinen |
| 6,788,932 | B2 | 9/2004 | Nakamichi |
| 6,912,399 | B2 | 6/2005 | Zirul et al. |
| 7,177,632 | B1 | 2/2007 | Ringen et al. |
| 7,336,945 | B2 | 2/2008 | Ringen et al. |
| 2001/0013062 | A1 | 8/2001 | Ono |
| 2001/0016487 | A1 | 8/2001 | Hiatt, Jr. |
| 2002/0142807 | A1 | 10/2002 | Cho |
| 2002/0165012 | A1 | 11/2002 | Kirbas et al. |
| 2003/0112943 | A1 | 6/2003 | Kamil |
| 2003/0152198 | A1 | 8/2003 | Price |
| 2003/0153268 | A1 | 8/2003 | Tsai |
| 2004/0002329 | A1 | 1/2004 | Bhatia et al. |

OTHER PUBLICATIONS

Non-Final Rejection mailed Aug. 23, 2005 for U.S. Appl. No. 10/159,636.
Non-Final Rejection mailed Dec. 14, 2005 for U.S. Appl. No. 10/159,636.
Final Rejection mailed Jun. 6, 2006 for U.S. Appl. No. 10/159,636.
Notice of Allowance mailed Oct. 2, 2006 for U.S. Appl. No. 10/159,636.
Non-Final Rejection mailed Jun. 13, 2007 for U.S. Appl. No. 11/611,006.
Notice of Allowance mailed Oct. 17, 2007 for U.S. Appl. No. 11/611,006.
Non-Final Rejection mailed Sep. 7, 2005 for U.S. Appl. No. 10/158,812.
Examiner Interview Summary mailed Oct. 20, 2005 for U.S. Appl. No. 10/158,812.
Final Rejection mailed Jan. 24, 2006 for U.S. Appl. No. 10/158,812.
Non-Final Rejection mailed May 19, 2006 for U.S. Appl. No. 10/158,812.
Final Rejection mailed Nov. 3, 2006 for U.S. Appl. No. 10/158,812.
Advisory Action mailed Feb. 7, 2007 for U.S. Appl. No. 10/158,812.
Non-Final Rejection mailed Apr. 27, 2010 for U.S. Appl. No. 12/023,465, 42 pages.
Final Rejection mailed Aug. 30, 2010 for U.S. Appl. No. 12/023,465, 23 pages.
Non-Final Office Action dated Mar. 30, 2011 for U.S. Appl. No. 12/023,465, 18 pages.
Final Office Action dated Sep. 27, 2011 for U.S. Appl. No. 12/023,465, 16 pages.
Office Action dated Sep. 7, 2012 for U.S. Appl. No. 12/023,465, 21 pages.
Office Action dated Nov. 20, 2013 for U.S. Appl. No. 12/023,465, 27 pages.
Office Action dated Apr. 11, 2013 for U.S. Appl. No. 12/023,465, 23 pages.

SYSTEM AND METHOD FOR CONTROLLING THE USE OF A WIRELESS DEVICE

CROSS-REFERENCE TO RELATED APPLICATIONS

This application is a continuation of, and claims the benefit of priority to, each of U.S. patent application Ser. No. 12/023,465 (now U.S. Pat. No. 8,798,608, issued on Aug. 5, 2014) entitled "SYSTEM AND METHOD FOR CONTROLLING THE USE OF A WIRELESS DEVICE," filed Jan. 31, 2008, which is a continuation of U.S. patent application Ser. No. 11/611,006 entitled "SYSTEM AND METHOD FOR CONTROLLING THE USE OF A WIRELESS DEVICE," filed Dec. 14, 2006 (now U.S. Pat. No. 7,336,945,issued on Feb. 26, 2008), which is a continuation of U.S. patent application Ser. No. 10/159,636, entitled "SYSTEM AND METHOD FOR CONTROLLING THE USE OF A WIRELESS DEVICE," filed May 30, 2002, (now U.S. Pat. No. 7,177,632, issued on Feb. 13, 2007). The entireties of each of the above noted applications are incorporated herein by reference.

TECHNICAL FIELD

The present invention generally relates to telecommunications, and more specifically, to control of a wireless device.

BACKGROUND OF THE INVENTION

Wireless devices, including cellular telephones, are becoming increasingly popular. Public use of wireless communication devices has significantly increased over the last several years. For instance, the purchase and use of cellular telephones, pagers, and Personal Digital Assistants ("FDA") have become common. To support the increased use of wireless devices, various wireless networks have been created, and expanded, to allow use of wireless devices in increasing areas of coverage. In general, wireless service providers enable use of the wireless devices by activating the wireless devices (upon purchase of the wireless devices). A wireless device typically operates by communicating with a wireless network to which a user subscribes through a transmitter/receiver within the wireless device.

A typical wireless network consists of multiple, low-power transmitters/receivers providing wireless service to a series of overlapping coverage areas referred to as cells. Each cell operates within a specific set of frequencies, with a certain frequency designated as a control frequency used to manage the network. A Mobile Telephone Switching Office ("MTSO") typically controls portions of the wireless network, managing a group of cells. A large wireless network may consist of several different MTSOs, each MTSO in control of multiple cells, and the MTSOs in communication with each other, either directly or through the Public Switched Telephone Network ("PSTN"). Each MTSO will also communicate with the PSTN in order to connect calls from wireless devices to standard PSTN telephones, as well as calls from PSTN phones to the wireless devices.

A wireless device operating within the coverage of a particular cell receives transmissions from, and sends transmissions to, the transmitter/receiver providing coverage for the cell. As a wireless device user engaged in a call leaves one cell and enters another cell, a "hand off" of the telephone call is handled by the MTSO, such that the wireless communications from the user's wireless device are switched from the transmitter/receiver of the cell the user is leaving to the transmitter/receiver for the cell that the user is entering.

Wireless service providers typically provide wireless service to a user based upon a charge to the user for the time spent using the wireless service. In other words, the typical wireless service charges the user a set fee per month for a predetermined amount of time using the wireless device within that month. The wireless service provider usually charges substantial fees for use of the wireless device in excess of the allotted amount of time within the month. Additionally, certain telephone numbers called by the user of the wireless device may incur additional charges above the set fee, including for example long distance calls, calls to pay services, overseas calls, etc.

Consequently, there is a need for controlling the use of wireless devices.

SUMMARY OF THE INVENTION

One embodiment, among others, of the present invention provides a system and method for enabling a user to select telephone numbers to which a wireless device may place calls and from which the wireless device may receive calls. One preferred embodiment of the present invention includes software for use on a general purpose computer allowing the user to input into the memory of a wireless device desired telephone numbers that may not be changed by the operator of the wireless device. The computer software also programs the wireless device to only place calls to, or receives calls from, the telephone numbers entered into the memory of the wireless device by the owner.

Other features and advantages of the present invention will become apparent to one skilled in the art upon examination of the following detailed description when read in conjunction with the accompanying drawings. It is intended that all such features and advantages be included herein within the scope of the present invention.

BRIEF DESCRIPTION OF THE DRAWINGS

Many aspects of the invention will be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Generally stated, the preferred embodiments of the present invention enable a general purpose computer to program into a wireless device (such as a cellular telephone among other examples) the telephone numbers that the wireless device is allowed to call, and/or the telephone numbers that the wireless device is allowed to receive calls from, without the need for a call blocking service provided by the owner's wireless service provider. After the owner has programmed the wireless device, an operator of the wireless device is restricted to placing calls to, and receiving calls from, telephone numbers programmed into the wireless device by the owner. The operator may not alter the telephone numbers that the wireless device is allowed to call without reprogramming the wireless device through the owner's computer.

Figure 1:
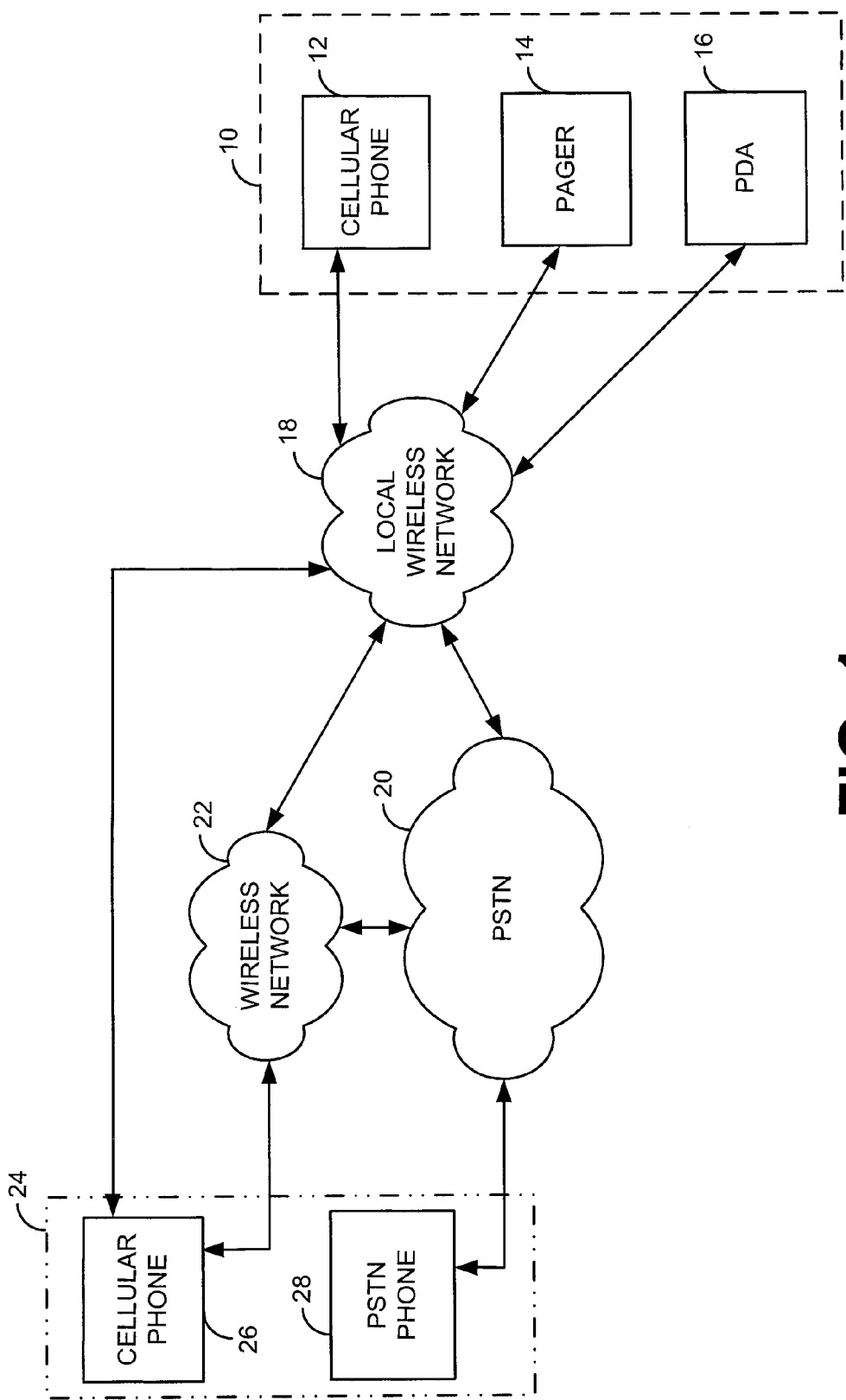
FIG. 1 is a block diagram that illustrates an exemplary telephone system that may be used with the preferred embodiments of the present invention.

FIG. 1 illustrates an exemplary telephone system in which a wireless device programmed in accordance with one preferred embodiment of the present invention may be used. As depicted in FIG. 1, an owner or operator of the wireless device 10 may operate the wireless device 10 pursuant to wireless service provided by the owner's local wireless network 18. In the preferred embodiment, the wireless device 10 is a cellular telephone 12. However, in other embodiments, the wireless device 10 may be a pager 14 (including an I-pager), a PDA 16, or any other wireless device 10.

As depicted in FIG. 1, there are various ways in which an operator of the wireless device 10 may either place a call to, or receive a call from, a second party 24. For example, the second party 24 may be placing a telephone call to the operator via the second party's cell phone 26. If the second party's cell phone 26 is in the same local wireless network 18 as the operator, the cell phone 26 will transmit a signal to the local wireless network 18, which, in turn, will transmit a signal to the operator's wireless device 10.

If the second party's cell phone 26 is not within the same local wireless network 18 as the operator, the second party's cell phone 26 will transmit a signal to the second party's wireless network 22. The second party's wireless network 22 will, in turn, transmit a signal either directly to the operator's local wireless network 18, or through the PSTN 20, to the operator's local wireless network 18 for transmission to the operator. The reverse is also true, and in the preferred embodiment, the operator may use his/her wireless device 10 to place a call to the second party 24 in a like manner.

Alternatively, the second party 24 may be placing a telephone call from a PSTN phone 28. The second party's PSTN phone 28 will communicate through the PSTN 20 to the operator's local wireless network 18 for transmission to the operator's wireless device 10. Again, the reverse is also true, and in the preferred embodiment, the operator may use his wireless device 10 to place a call to the second party 24 in a like manner.

The call from the second party 24 in various embodiments may be placed to the owner's cellular phone 12, pager 14, PDA 16, or other wireless device 10.

In accordance with one preferred embodiment of the present invention, the only telephone calls that the wireless device 10 would be allowed to accept are telephone calls placed from the telephone numbers programmed into the wireless device 10 by the owner as discussed below. Accordingly, in the preferred embodiment, if the telephone number of the second party 24 had been programmed into the owner's wireless device 10, the wireless device 10 would accept the call. Alternatively, if the telephone number of the second party 24 had not been programmed into the owner's wireless device 10, the wireless device 10 would not accept the call.

Thus, in a preferred embodiment of the present invention, the determination of whether or not the call will be accepted by the wireless device 10, and completed to the operator of the wireless device 10, is made within the wireless device 10, and not by the local wireless network 18. The wireless network 18 in the preferred embodiment is not aware that the owner has placed any call placing, or call receiving, limitations on the wireless device 10.

Similarly, in accordance with one preferred embodiment of the present invention, if the owner/operator of the wireless device 10 desires to use the wireless device 10 to place a call to the second party 24, the call will only be transmitted from the wireless device 10 to the owner's local wireless network 18 if the second party's 24 telephone number has been programmed into the wireless device 10. If the second party's 24 telephone number has not been programmed into the wireless device 10, the wireless device 10 will not transmit the telephone call to the owner's local wireless network 18.

In this manner, the uses to which the wireless device 10 may be put by an operator of the wireless device 10 can be controlled by the owner's selection of telephone numbers that may be called by the wireless device 10, or from which the wireless device 10 may receive calls. For example, and not intended as a limitation on the present invention, if the owner loses the wireless device 10, a finder of the wireless device 10 will be prevented from using the wireless device 10 for the finder's own purposes at the owner's expense, as the finder will not be able to place calls to numbers other than those programmed into the telephone, which are unlikely to be telephone numbers the finder desires to call.

Figure 2:
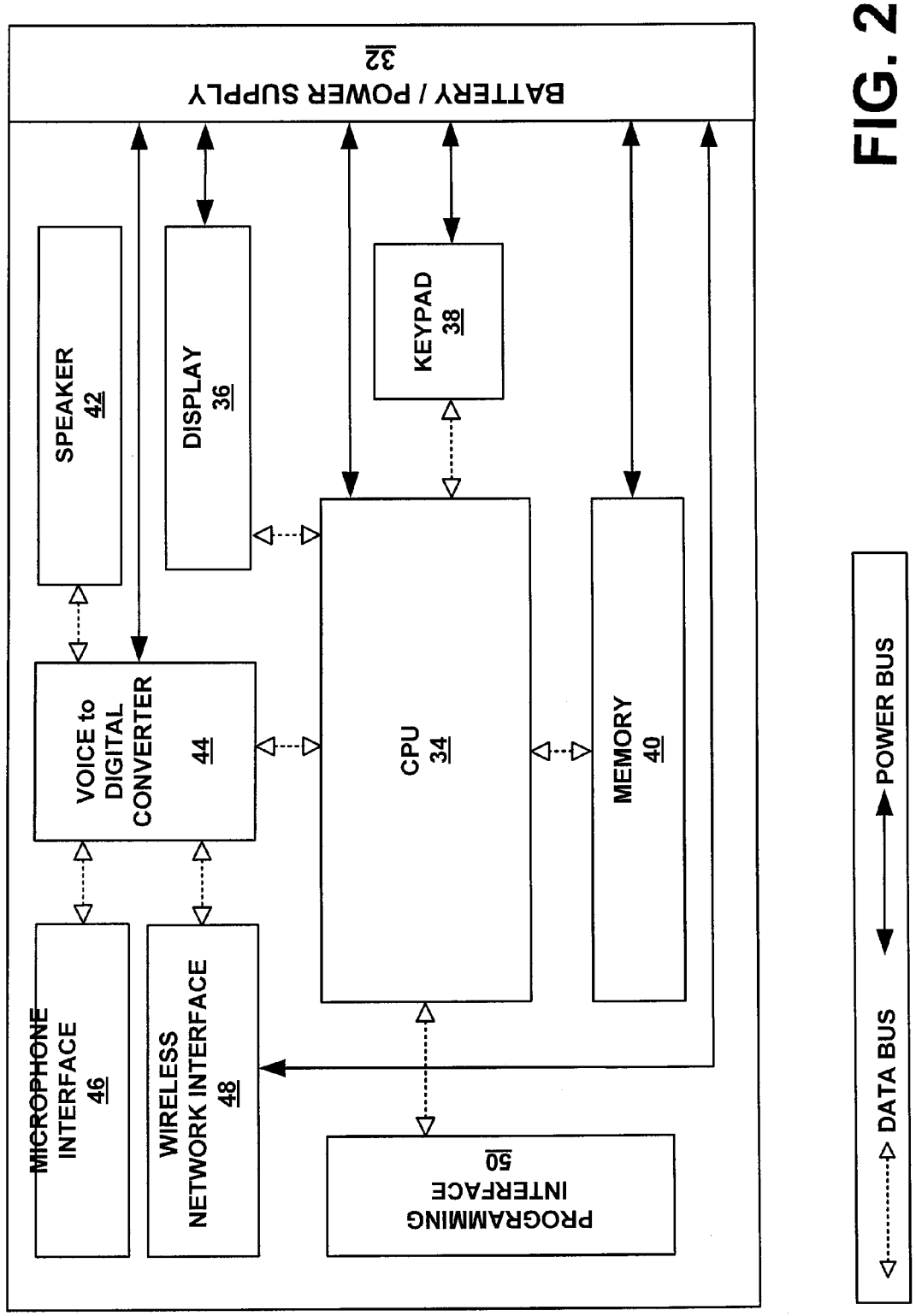
FIG. 2 is a block diagram depicting selected basic elements of an exemplary wireless device for use in the exemplary telephone system in FIG. 1.

FIG. 2 depicts a block diagram showing selected elements of an exemplary wireless device 10 that may be programmed in accordance with one embodiment, among others, of the present invention. As depicted in FIG. 2, the wireless device will include a power supply 32, which in a preferred embodiment is a battery. Additionally, the wireless device 10 will include a central processing unit (CPU) 34 to control the operation of the wireless device 10. Typical wireless devices 10 will also include a display 36, a keypad 38, a speaker 42, and memory 40, all in communication with the CPU 34.

Further, in a preferred embodiment, the wireless device 10 is a digital wireless device 10, and will typically therefore include, among other elements and connections that would be known to one reasonably skilled in the art, a voice-to-digital converter 44 in communication with a microphone interface 46 and a wireless network interface 48 (including an antenna, transmitter, and receiver), all in communication either directly or indirectly with the CPU 34. As depicted in FIG. 2, in the preferred embodiment, the wireless device 10 also includes a programming interface 50 in communication with the CPU 34.

As would be known to one of ordinary skill in the art, various wireless devices 10 are configured with different programming interfaces 50. Even within a type of wireless device 10, such as cellular telephones 12 (FIG. 1), different manufacturers use differently configured programming interfaces 50. Any such respective programming interface 50 may be used for programming the wireless devices 10 in accordance with various embodiments of the present invention.

In one preferred embodiment, the owner, through a device connected to the programming interface 50, programs the wireless device 10, such that the telephone numbers that the wireless device 10 is allowed to receive calls from, or place calls to, are stored in the memory 40 of the wireless device 10. When an operator of the wireless device 10 attempts to place a telephone call using the wireless device 10, the operator will enter the telephone number to be called through the keypad 38.

The CPU 34 receives the telephone number that the operator desires to call, and checks the memory 40 to determine whether the telephone number entered via the keypad 38 is one of the telephone numbers stored in the memory 40 of the wireless device 10. If the telephone number entered through the keypad 38 is not one of the telephone numbers stored in the memory 40, the CPU 34 will not allow the telephone call to be transmitted to the local wireless network 18 (FIG. 1), and a message may be displayed to the operator via the display 36 indicating that the telephone call cannot be placed.

In the preferred embodiment, if the telephone number entered by the operator of the wireless device 10 through the keypad 38 is determined by the CPU 34 to match one of the telephone numbers stored in the memory 40, the CPU 34 allows the call to be transmitted via the wireless network interface 48 to the local wireless network 18 (FIG. 1) according to the normal operation of the wireless device 10.

Similarly, when a second party 24 (FIG. 1) attempts to place a telephone call to the wireless device 10, the local wireless network 18 (FIG. 1) transmits a signal to the wireless device 10 which is received through the wireless network interface 48. The wireless network interface 48 communicates with the CPU 34, which compares the telephone number being received by the wireless device 10 to the telephone numbers stored in the memory 40 of the wireless device 10 from which the wireless device 10 is allowed to receive calls.

If the incoming telephone number is not one of the telephone numbers stored in the memory 40 of the wireless device 10, the CPU 34 refuses the transmission from the local wireless network 18 (FIG. 1), and a voice connection is not established with the wireless device 10. In one preferred embodiment, the call is terminated without being transferred to any voicemail service associated with the wireless device 10. In an alternative embodiment, the second party 24 (FIG. 1) attempting to call the wireless device 10 will hear a busy signal.

If the incoming telephone call received by the wireless device 10 is a telephone number that is stored in the memory 40 of the wireless device 10 as a telephone number from which the wireless device 10 may accept calls, the CPU 34 allows the completion of the call in accordance with the normal operation of the wireless device 10.

It is not necessary under preferred embodiments of the present invention that the set of telephone number(s) to which a wireless device 10 is allowed to place telephone calls be the same as the set of telephone numbers from which the wireless device 10 is allowed to receive calls. In other words, in the preferred embodiment, there may be two different and distinct sets of numbers stored in the memory 40 of the wireless device. The first set of numbers comprising the telephone numbers the wireless device 10 is allowed to call (such as in an acceptable outgoing number(s) area of memory), and the second set of numbers comprising telephone numbers from which the wireless device is allowed to receive calls (such as in an acceptable incoming number(s) area of memory).

Thus, it is possible that the wireless device 10 will be programmed such that the wireless device 10 is allowed to place a telephone call to a certain telephone number, but at the same time the wireless device 10 is not allowed to receive telephone calls from that same telephone number if the owner so desires, and vice-versa (of course, both sets may be identical at the user's option).

Preferably, certain features that may be available on typical wireless devices 10, including speed dial, will still operate under the present invention. However, in one preferred embodiment of the present invention, telephone numbers stored in the memory 40 of the wireless device 10 may only be added to the memory 40, or deleted from the memory 40 by the owner through a device connected to the programming interface 50. These telephone numbers may not be entered into the memory 40 or deleted from the memory 40 of the wireless device 10 through an operator's manipulation of the keypad 38, or other input mechanism located directly on the wireless device 10.

Accordingly, in one preferred embodiment of the present invention, an operator of the wireless device 10 may not alter the telephone numbers that may be dialed by the wireless device 10 by manipulation of the wireless device itself, but may only alter the telephone numbers stored in the memory 40 of the wireless device 10 through a device connected to the programming interface 50.

As would be known to one of ordinary skill in the art, the memory 40 may be any type of machine readable storage typically used within wireless devices 10, including programmable read-only memory (PROM), erasable programmable read-only memory (EPROM), electronically erasable programmable read-only memory (EEPROM), etc.

Figure 3:
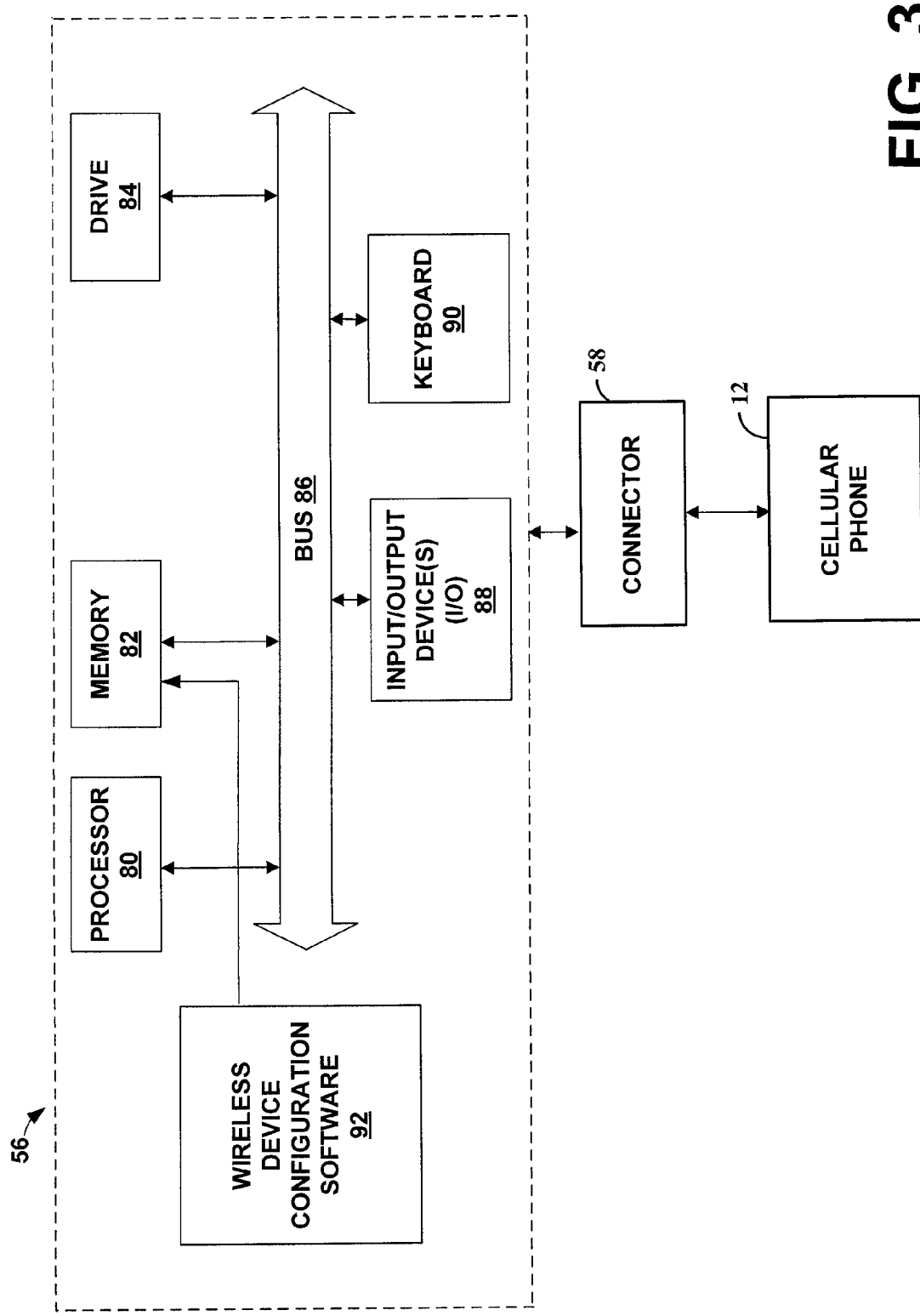
FIG. 3 is a block diagram that illustrates a preferred embodiment of the present invention.

As depicted in FIG. 3, a preferred embodiment of the present invention will include wireless device configuration software 92 operating on an owner's general purpose computer 56. As known to one of ordinary skill in the art, the computer 56 will typically include, among other elements a processor 80, memory 82, one or more drives 84 (such as a disk drive, CD ROM drive, etc.), bus 86, one or more input and/or output device(s) 88 (such as a display), and a keyboard 90.

The software 92 will reside in the memory 82 of the computer 56, once installed on the computer 56 by the owner. The software 92 enables the owner to program the wireless device 10. A connector 58 between the computer 56 and the wireless device 10 transmits information to the wireless device 10. The wireless device 10 in FIG. 3 includes the basic elements depicted in FIG. 2, including the programming interface 50 (FIG. 2). In the preferred embodiment depicted in FIG. 3, the wireless device 10 is a cellular telephone 12.

Additionally, in a preferred embodiment, the computer 56 is the owner's home computer 56, which may be of any brand or type, including laptop, notebook, or other portable computer 56. In the preferred embodiment, the information is transmitted from the computer 56 to the cellular telephone 12 through a serial port on the computer 56. The preferred serial port may be any of a variety of serial interfaces known to one of skill in the art, including IEEE 1394 High Performance Serial Bus, Universal Serial Bus (USB), or other serial bus standard. In other embodiments, the information may be transmitted from the computer 56 to the cellular telephone 12 through other ports on the computer 56, including a parallel port.

In different embodiments a variety of connectors 58 may be implemented to transmit the programming from the computer 56 to the cellular telephone 12, including a cable connected to the computer 56 on one end, and connected to the cellular telephone 12 at the other end. In one preferred embodiment, the connector 58 is a cradle 58. The preferred cradle 58 connects to the computer 56 through the preferred serial port of the computer 56. The cradle 58 further includes plug elements configured to receive the cellular telephone 12 and engage the programming interface 50 (FIG. 2).

As would be known to one of ordinary skill in the art, wireless devices 10 sold by various manufacturers have different programming interfaces 50 (FIG. 1) incorporated into the wireless device 10, including plug elements of different configurations. In various embodiments, the cradle 58 may include a plurality of distinct plug elements configured to receive wireless devices 10 from multiple manufacturers. In other embodiments, the cradle 58 may be configured with one set of plug elements for use with a particular manufacturer's wireless device 10. In these embodiments, the particular cradle 58 used will depend upon the manufacturer of the owner's wireless device 10.

In the preferred embodiment depicted in FIG. 3, to program the cellular telephone 12, the cellular telephone 12 is engaged with the plug elements of the cradle 58, while the cradle 58 is connected to the computer 56. The software 92 operating on the computer 56 allows the owner to input telephone numbers that the cellular telephone 12 will be allowed to place calls to, and receive calls from. The software 92 may allow the owner to enter the information into the computer 56 for transmission through the cradle 58 to the cellular telephone 12 in a variety of manners, including a menu driven system, text interface, or in the preferred embodiment, a graphical user interface (GUI) 60.

Figure 4:
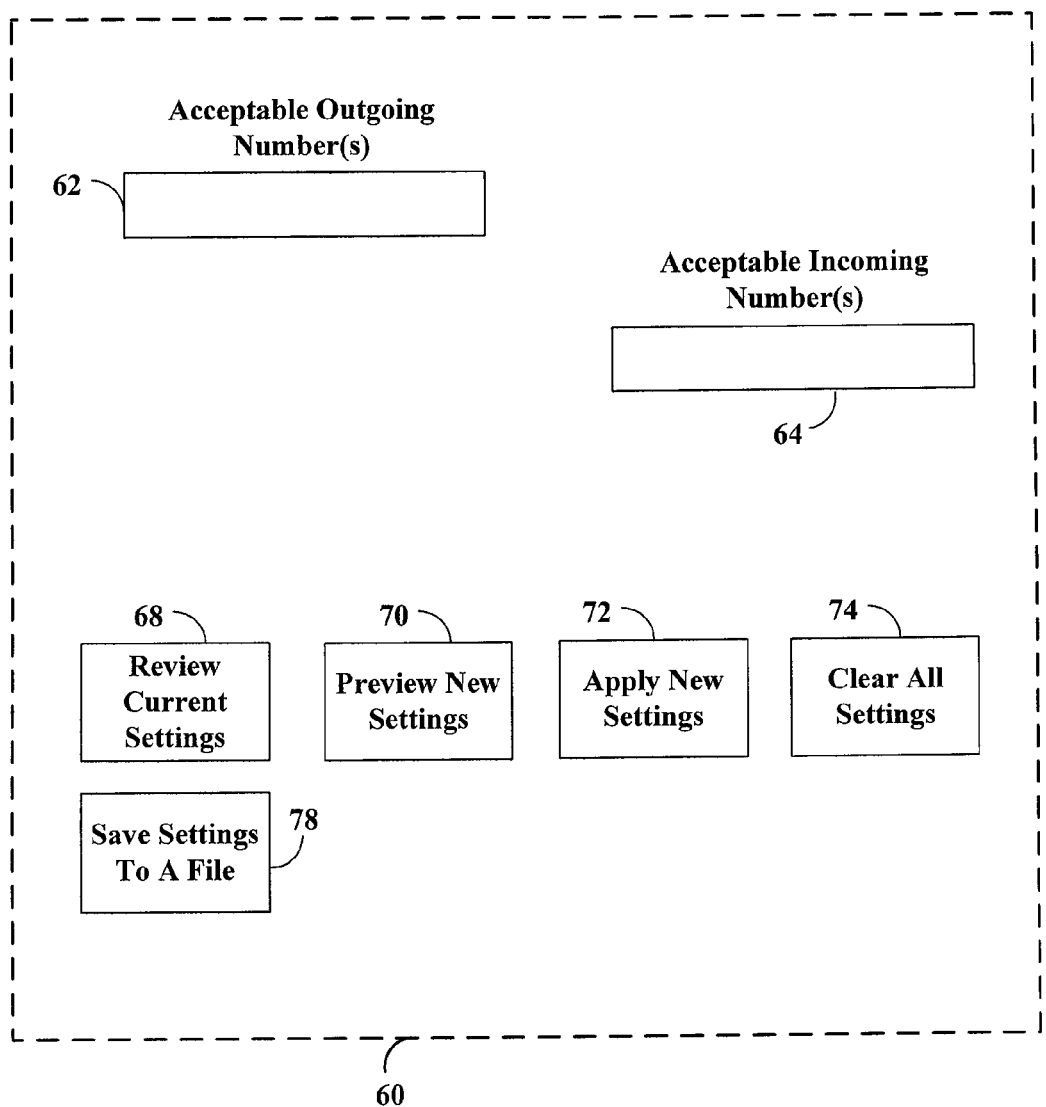
FIG. 4 shows an exemplary graphical user interface for use in the preferred embodiment depicted in FIG. 3.

FIG. 4 depicts one screen of an exemplary GUI 60 that the software 92 (FIG. 3) may display on display 88 (FIG. 3) to interface with the owner, enabling the owner to program the wireless device 10 (FIG. 1). In the preferred embodiment depicted in FIG. 4, the GUI 60 will provide an input for acceptable outgoing number(s) 62, as well as an input for acceptable incoming number(s) 64. In this manner, the owner through the GUI 60, may enter, through keyboard 90, one or more telephone numbers in the acceptable outgoing number(s) 62 for restricting outgoing calls to only entered telephone numbers, and in acceptable incoming number(s) 64 for restricting incoming calls to only entered telephone numbers.

In a preferred embodiment, the GUI 60 will also include other functions, including a review current settings function 68, preview new settings function 70, apply new settings function 72, clear all settings function 74, and save settings to a file function 78. These various functions allow the owner options when programming a wireless device 10 (FIG. 1), or when programming different types of wireless devices 10 (FIG. 1).

For instance, in a preferred embodiment, activating the review current settings function 68 allows the owner to review the current settings of a wireless device 10 (FIG. 1) plugged into the cradle 58 (FIG. 3). In this manner, the owner may review the telephone numbers stored in the memory 40 (FIG. 2) of the wireless device 10 (FIG. 1).

Similarly, the preview new settings function 70 allows an owner to review a new set of telephone numbers that have been input by the owner before the new telephone numbers are programmed into the wireless device 10 (FIG. 1).

Another feature of the present invention includes the ability to quickly and easily alter the programming of a wireless device 10 (FIG. 1), or of a plurality of wireless devices 10 (FIG. 1). To that end, the save settings to a file function 78 of the preferred embodiment allows a owner to save on the computer 56, a set of telephone numbers that the owner may wish to use, either with multiple wireless devices 10 (FIG. 1), or at different times with a single wireless device 10 (FIG. 1).

As an example, and not intended to be a limitation on the present invention, a cellular telephone 12 (FIG. 3) may be programmed with one setting, or listing of telephone numbers, when the cellular telephone 12 (FIG. 3) is to be operated by the owner's child. The owner may wish to program the cellular telephone 12 (FIG. 3), with an entirely different setting or listing of telephone numbers when the cellular telephone 12 (FIG. 3) is to be operated for another purpose or by another individual.

By programming the cellular telephone 12 (FIG. 3) from a file stored on the computer 56 (such as on a hard drive 84) containing the desired set of telephone numbers, rather than re-typing the desired set of telephone numbers by hand, the owner may quickly program the cellular telephone 12 (FIG. 3) when the cellular telephone 12 (FIG. 3) is to be operated by the child. Then, the owner may quickly and easily reprogram the cellular telephone 12 (FIG. 3), when the cellular telephone 12 (FIG. 3) is to be used for a different purpose, by accessing a second file stored on the computer 56 containing a second set of telephone numbers.

Similarly, by saving various sets of telephone numbers to various files on the computer 56 with the save settings to a file function 78, the owner may also quickly and easily program different wireless devices 10 (FIG. 1) with a preferred set of telephone numbers, such as programming a cellular telephone 12 (FIG. 3) with the telephone numbers saved in one file, and then programming a pager 14 (FIG. 1) with the telephone numbers saved in a second file.

Additionally, in the preferred embodiment as depicted in FIG. 4, the GUI 60 may include various other functions, including a clear all settings function 70, which when activated, allows a owner to clear all telephone numbers programmed into the wireless device 10 (FIG. 1), deleting from the memory 40 (FIG. 2) of the wireless device 10 (FIG. 1), any telephone numbers that have been previously stored.

Similarly, in the preferred embodiment, the GUI 60 may include an apply new settings function 72, which when activated by the owner, will program the settings currently selected by the owner in the outgoing calls allowed input 62 and incoming calls allowed input 64 into the memory 40 (FIG. 2) of the wireless device 10 (FIG. 1).

As would be known to one of ordinary skill in the art various other settings and/or functions may be used in the GUI 60 in the preferred embodiment of the present invention to allow the owner control over other various functions associated with programming the wireless device 10 (FIG. 1).

As an additional measure to ensure control of the use of the wireless device 10 (FIG. 1) in one preferred embodiment, the software operating on the owner's computer 56 will also program into the wireless device 10 (FIG. 1), a unique identifier associated with the owner and/or the owner's computer. In the preferred embodiment, the wireless device 10 (FIG. 10) will be programmed to only allow later programming of the wireless device 10 (FIG. 1) by a computer providing the unique identifier. As would be known to one of ordinary skill in the art, the unique identifier may be a random alphanumeric sequence generated by the computer program, a password selected by the owner at the prompting of the computer program, or any like identifier.

In this manner, the owner can ensure that the wireless device 10 (FIG. 1) may only be programmed by the owner, preventing reprogramming of the wireless device 10 (FIG. 1), including the telephone numbers stored in the memory 40 (FIG. 2) of the wireless device 10 (FIG. 1), without the owner's knowledge and/or permission.

Process and function descriptions can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A user equipment, comprising:
    a processor; and
    a memory that stores executable instructions that, when executed by the processor, facilitate performance of operations, comprising:
        storing, in a data store of the user equipment, number data representing a set of telephone numbers, wherein the user equipment is restricted to communicate with a set of respective communication devices associated with the set of telephone numbers,
        in response to verifying that first request data indicative of a first request for a modification of the number data has been received via an input interface of the user equipment, rejecting the first request,
        in response to verifying that second request data indicative of a second request for the modification of the number data has not been received via the input interface of the user equipment and has been received from a device coupled to the user equipment via a communication link, initiating an authentication of the device based on identifier data representing an alphanumeric sequence associated with the device, and
        in response to determining that the authentication satisfies a defined authentication criterion, accepting the second request to facilitate the modification.

2. The user equipment of claim 1, wherein the communication link is a wired communication link.

3. The user equipment of claim 1, wherein the user equipment is coupled to a serial port of the device via the communication link.

4. The user equipment of claim 3, wherein the user equipment is coupled to the serial port via a cradle device that comprises a plug element that facilitates communication with the user equipment.

5. The user equipment of claim 1, wherein the user equipment is coupled to a parallel port of the device via the communication link.

6. The user equipment of claim 1, wherein the operations further comprise:
    in response to receiving, from the device via the communication link, instruction data that requests the number data, directing the number data to the device via the communication link.

7. The user equipment of claim 1, wherein the number data comprises information indicative of a first subset of the set of telephone numbers associated with a first subset of the set of respective communication devices from which the user equipment is authorized to receive first communication data and a second subset of the set of telephone numbers associated with a second subset of the set of respective communication devices to which the user equipment is authorized to transmit second communication data.

8. The user equipment of claim 1, wherein the user equipment is a first user equipment and the operations further comprise:
    receiving, from a second user equipment, communication data associated with a communication session, and
    in response to determining that the set of telephone numbers does not comprise a telephone number of the second user equipment, terminating the communication session.

9. The user equipment of claim 1, wherein the user equipment is a first user equipment and the operations further comprise:
    receiving, from the input interface of the user equipment, instruction data indicative of an instruction for initiating a communication session with a second user equipment, and
    in response to determining that the set of telephone numbers does not comprise a telephone number of the second user equipment, prohibiting an initiation of the communication session.

10. The user equipment of claim 9, wherein the operations further comprise:
    in response to the prohibiting, facilitating a rendering of message data via a display interface of the user equipment, wherein the message data specifies that the initiation of the communication session has been denied.

11. The user equipment of claim 1, wherein the input interface comprises a keypad.

12. A computer-readable storage device comprising instructions that, in response to execution, cause a user equipment comprising a processor to perform operations, comprising:
    storing in a data store of the user equipment, number data representing a set of telephone numbers, wherein the user equipment is restricted to communicate with a set of respective communication devices associated with the set of telephone numbers;
    rejecting a first request to modify the number data, wherein the first request is determined to be received via an input interface of the user equipment;
    initiating an authentication of a second request to modify the number data, wherein the second request is not determined to be received via the input interface of the user equipment and is determined to be received via a device coupled to the user equipment via a communication link and wherein the authentication employs identifier data representing an alphanumeric sequence associated with the device; and
    in response to determining that the authentication satisfies a defined authentication criterion, modifying the number data based on the second request.

13. The computer-readable storage device of claim 12, wherein the communication link is a wired communication link.

14. The computer-readable storage device of claim 12, wherein the input interface is a keypad of the user equipment.

15. The computer-readable storage device of claim 12, wherein the second request instructs the user equipment to delete the number data and the modifying comprises deleting the number data from the data store.

16. The computer-readable storage device of claim 12, wherein the set of telephone numbers comprises a telephone number associated with a communication device of the set of respective communication devices, wherein the user equipment is authorized to transmit communication data to the communication device.

17. The computer-readable storage device of claim 12, wherein the set of telephone numbers comprises a telephone number associated with a communication device of the set of respective communication devices, wherein the user equipment is authorized to receive communication data from the communication device.

18. A method, comprising:
   storing, by a first piece of equipment comprising a processor, identifier data indicative of a second piece of equipment within a data store of the first piece of equipment, wherein the storing prohibits a communication between the first piece of equipment and a third piece of equipment disparate from the second piece of equipment;
   in response to determining that first modification data that initiates a first modification of the identifier data has been received via an input interface of the first piece of equipment, prohibiting, by the first piece of equipment, the first modification;
   in response to determining that second modification data that initiates a second modification of the identifier data has not been received via the input interface of the first piece of equipment and has been received via a device coupled to the first piece of equipment via a communication link, verifying, by the first piece of equipment, that the device is an authorized device based on credential data indicative of an alphanumeric sequence associated with the device; and
   in response to the verifying, allowing, by the first piece of equipment, the second modification.

19. The method of claim 18, further comprising:
   receiving, by the first piece of equipment, the second modification data via a wired communication link.

20. The method of claim 18, further comprising:
   receiving, by the first piece of equipment, instruction data from the device via the communication link, wherein the instruction data requests the identifier data; and
   in response to the receiving, facilitating, by the first piece of equipment, a transmission of the identifier data to the device via the communication link.

\* \* \* \* \*